UNITED STATES PATENT OFFICE.

ALFRED L. RISPLER, OF ST. LOUIS, MISSOURI, ASSIGNOR TO MONSANTO CHEMICAL WORKS, OF ST. LOUIS, MISSOURI, A CORPORATION OF MISSOURI.

PROCESS OF PRODUCING PHTHALEINS.

1,381,503.

Specification of Letters Patent.  Patented June 14, 1921.

No Drawing.  Application filed May 10, 1920. Serial No. 380,412.

*To all whom it may concern:*

Be it known that I, ALFRED L. RISPLER, a citizen of Germany, residing at St. Louis, Missouri, have invented a certain new and useful Improvement in Processes of Producing Phthaleins, of which the following is a full, clear, and exact description, such as will enable others skilled in the art to which it appertains to make and use the same.

This invention relates to the manufacture of phthaleins.

The condensation of phthalic anhydrid with phenols involves the substitution of hydrogen atoms of the aromatic nucleus of the phenols and the removal of oxygen atoms from the phthalic anhydrid with accompanying formation of water. The condensation of phthalic anhydrid with most phenols will occur only in presence of dehydrating agents, such as concentrated sulfuric acid, anhydrous zinc chlorid or stannic tetrachlorid. As the condensation reaction progresses, the formation of water likewise progresses, and the water formed dilutes the reaction mixture and the dehydrating agents present and correspondingly retards or inhibits the condensation process. In consequence of the fact that the reaction mixture becomes diluted by the water of reaction, it is not possible to condense perfectly the applied quantity of phthalic anhydrid with the phenols.

The use of concentrated sulfuric acid, anhydrous zinc chlorid or stannic tetrachlorid as condensing agents has the disadvantage that tarry by-products are formed which interfere with the refining of the phthaleins and that a subsidiary ortho condensation occurs, the result of which are anhydrids such as the fluoran in the manufacture of phenolphthalein, causing thus a loss of the materials applied in the reaction. With above mentioned condensing agents, yields of only 30 to 60% of the theory can be obtained when used in the condensation of phthalic anhydrid with phenol for the preparation of phenolphthalein.

One object of my invention is to provide a process for producing phthaleins by which the reaction can be made to proceed to substantial completion at a comparatively low temperature.

Another object is to provide a process of the character mentioned by which the desired para substituted phthalein are formed in a high state of purity from which the pure phthaleins are easily obtained.

Another object is to provide a process for the purpose described that can be easily controlled so as to bring about a maximum condensation in the para position to the hydroxyl groups.

And still another object is to provide a process by which phthaleins can be produced without the formation of large amounts of tarry by-products which would interfere with the refining process.

To this end I have devised a process for producing phthaleins, which, briefly described, consists in using an anhydrous aromatic sulfonic acid or a mixture containing such an acid, to bring about the condensation of phthalic anhydrid and phenols. Such a process is superior to the processes heretofore used for producing phthaleins, in that the water formed during the progress of the condensation reaction is taken up by the anhydrous aromatic sulfonic acid in a highly advantageous manner, thereby enabling the reaction to be carried to substantial completion at a comparatively low temperature.

In using my process for producing phenolphthalein from phthalic anhydrid and phenol I mix approximately 100 lbs. of phthalic anhydrid and approximately 200 lbs. of phenol in a suitable container, preferably a glass enameled, steam-jacketed kettle and heat the mixture to approximately 80° C. When the phthalic anhydrid has gone perfectly into solution a quantity of a suitable anhydrous aromatic sulfonic acid (usually from 200 to 250 lbs.) is added to the mixture and the mixture stirred or agitated until the sulfonic acid has gone into solution. The reaction mass is then kept at a temperature of approximately 120° C. for from ten to twelve hours, after which time the reaction usually is completed. The crude phenolphthalein is then washed with water to remove the excess of phenol, then dissolved in caustic soda solution, filtered and precipitated with acid, whereafter it is recrystallized from alcohol, giving a high grade pure phenolphthalein.

The action of the anhydrous aromatic sulfonic acid can be increased when a proportional amount of anhydrous zinc chlorid is added to the reaction mass. In the above example, for instance, the 200 to 250 lbs. sulfonic acid may be replaced by a mixture of 175 lbs. sulfonic acid and 50 lbs. anhydrous zinc chlorid. In this case the portion of the sulfonic acid which has already taken up water will act on the zinc chlorid under formation of the zinc salt of the sulfonic acid and hydrochloric acid. The latter will distil off from the reaction mass and take along the water of reaction.

In this way the reaction can be carried on to completion and a yield of 195 lbs. phenolphthalein can be obtained, which is equivalent to about 90% of the theoretical yield.

Having thus described my invention, what I claim as new and desire to secure by Letters Patent is:

1. A process for producing phthaleins, characterized by condensing phthalic anhydrid with a phenol in the presence of an anhydrous aromatic sulfonic acid, whereby the sulfonic acid acts as a condensing as well as a dehydrating agent.

2. A process for producing phthaleins, characterized by mixing an anhydrous aromatic sulfonic acid with phthalic anhydrid and a phenol and heating said mixture.

3. A process for producing phthaleins, characterized by mixing phthalic anhydrid and a phenol, heating said mixture, adding an anhydrous aromatic sulfonic acid to the mixture after the phthalic anhydrid goes into solution, and maintaining the mass at a temperature of approximately 120° C. to complete the reaction.

4. A process for producing phthaleins, characterized by condensing phthalic anhydrid with phenols in the presence of an anhydrous aromatic sulfonic acid and zinc chlorid.

5. A process for producing phenolphthalein, characterized by condensing phthalic anhydrid and phenol in the presence of an anhydrous aromatic sulfonic acid.

6. A process for producing phenolphthalein, characterized by heating a mixture of phthalic anhydrid and phenol until the phthalic anhydrid has gone perfectly into solution, adding an anhydrous aromatic sulfonic acid to the mixture and stirring or agitating the mass until the sulfonic acid has gone into solution, and maintaining the mass at a temperature of approximately 120° C. until the action is completed.

7. A process for producing phenolphthalein, characterized by mixing approximately 100 lbs. of phthalic anhydrid with approximately 200 lbs. of phenol, heating said mixture to a temperature of approximately 80° C., adding from 200 to 250 lbs. of an anhydrous aromatic sulfonic acid to the mixture and stirring the mass until the sulfonic acid goes into solution, and maintaining the mass at a temperature of approximately 120° C. for approximately ten to twelve hours.

ALFRED L. RISPLER.